(No Model.)
W. NIGHSWONGER.
GRAIN DRILL.
No. 379,179. Patented Mar. 6, 1888.
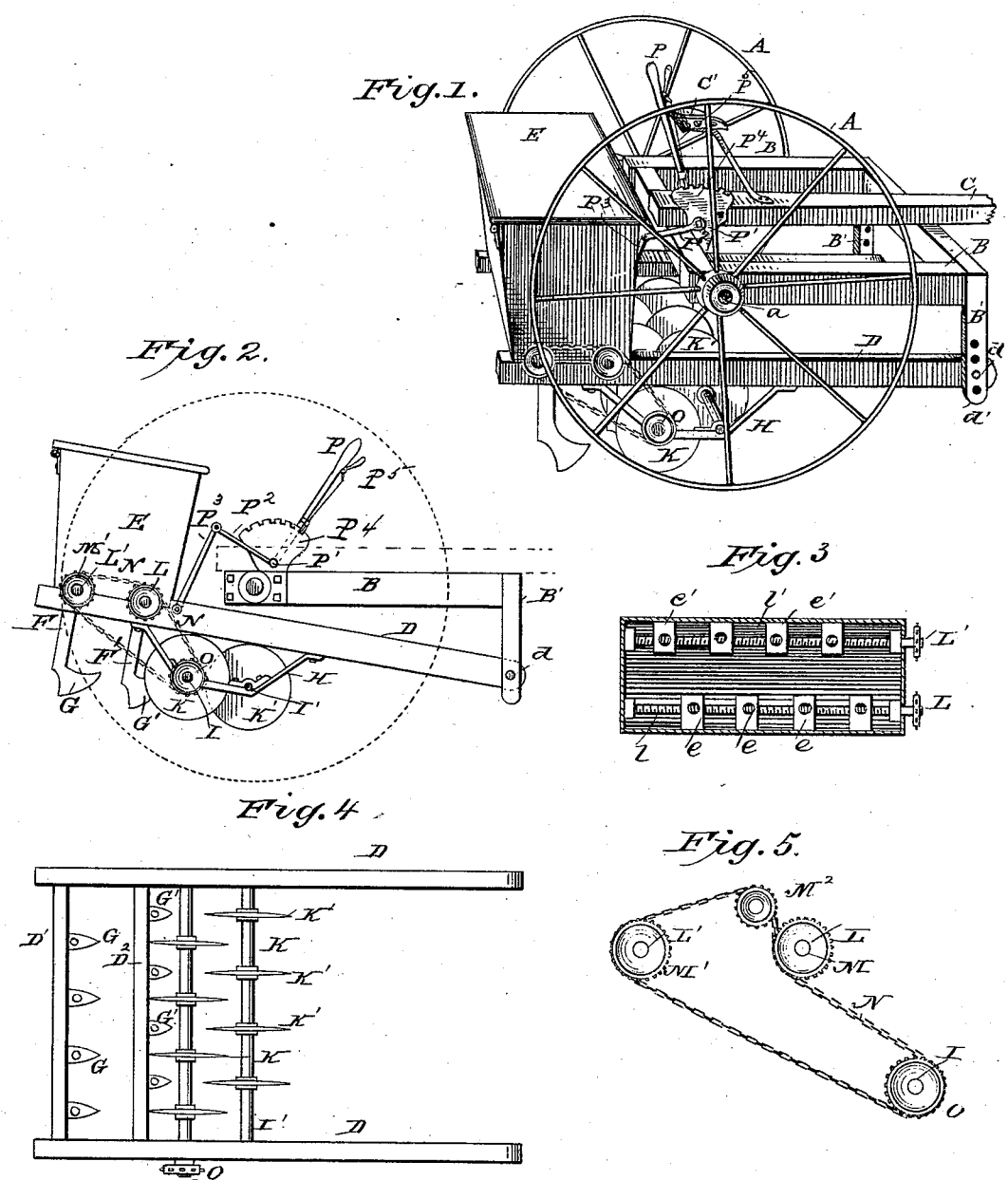

UNITED STATES PATENT OFFICE.

WILLIAM NIGHSWONGER, OF PEOTONE, KANSAS.

GRAIN-DRILL.

SPECIFICATION forming part of Letters Patent No. 379,179, dated March 6, 1888.

Application filed January 26, 1887. Serial No. 225,557. (No model.)

*To all whom it may concern:*

Be it known that I, WILLIAM NIGHSWONGER, of Peotone, in the county of Sedgwick and State of Kansas, have invented a new and useful Improvement in Grain-Drills, of which the following is a specification.

The object of my invention is to provide an improved grain-drill, in which a series of colters are made to act in conjunction with a series of hoes to pulverize the ground and cut down the weeds and trash in advance of the seed-depositors, and in which the feed will be cut off and the machine simultaneously placed in position for turning or transportation, and in which a seed-box having a double row of seed-openings may be provided with a feed which will operate in opposite directions within the box to insure an even distribution of seed therein; and the improvement consists in certain constructions and combinations of parts, hereinafter described, and particularly designated in the claims.

In the accompanying drawings, Figure 1 is a side elevation of the machine in its working position; Fig. 2, a similar view of the frame in its raised position with the wheels shown by dotted lines; Fig. 3, a plan of the lower frame with the hopper removed; Fig. 4, a sectional plan of the hopper in detail, and Fig. 5 a detail showing a modification of means for turning the feed-shafts.

The wheels A revolve upon stud-axles $a$, bolted to the rear end of an upper frame, B, to which is also secured the tongue C and seat C', and to the forward end of which is bolted depending arms B', to the lower ends of which is adjustably secured, by pin $d$ and holes $d'$, the forward end of a lower or cultivator frame, D. The rear end of said cultivator-frame supports a seed-box, E, and has double cross-bars D' D² beneath the said seed-box, to each of which bars are attached the spouts or hollow shanks F F' of a double series of hoes, G G', arranged in separate rows, secured each to one of the said cross-bars.

Brackets H, secured to the under sides of each of the side pieces of the frame D, carry the ends of two parallel shafts, I I', upon which are secured a double series of disk-colters, K K', located upon said shafts to alternate and interlap with each other. The colters K are located on a line with and in advance of the hoes G, and the colters K' are located on a line with and in advance of the hoes G', the hoes G being consequently between the colters K and the hoes G' following between the paths of the colters K and hoes G. By this means clods and hard ground may be thoroughly pulverized, ample space may be had for securing the colters to their shafts and the hoes to the frames, and the grass and trash carried up in rear of the forward colters will be carried back and chopped or recut intermediately of its length between each of the forward colters by the rear colters.

The feed-box E has a double series of discharge-openings, $e$ $e'$, alternating with each other, to communicate with the corresponding double series of spouts F F' and hoes G G'. The openings $e$ in the forward side of the feed-box are controlled by a shaft, L, having a screw-thread, $l$, wound in one direction, and a shaft, L', has a screw-thread, $l'$, wound in the opposite direction, to control the openings $e'$ in the rear side of said feed-box.

A sprocket-wheel, M, upon the shaft L, and a sprocket-wheel, M', upon a shaft, L', engage with the links of a chain, N, which passes over and is driven by a sprocket-wheel, O, upon the colter-conveyer I.

As the conveyer I is revolved in the same direction by the chain N and the said conveyers are screw-threaded in opposite directions, the seed is forced through the bore in one direction by one conveyer and in the opposite direction by the other of said conveyers. The seed in the feed-box will thus be kept evenly distributed in the feed-box. The same result may be obtained by employing the same arrangement of a double series of openings and a feed-conveyer for each series controlled by conveyers threaded alike and revolved in opposite directions by passing the belt N first under the sprocket-wheel M, then over an idler sprocket-wheel M², then over the sprocket-wheel M', and then around the sprocket-wheel O upon the driving-axle, as shown in Fig. 5.

The lower or cultivator frame is raised for turning or transportation by a hand-lever, P, secured to a rock-shaft, P', supported upon the upper or wheel frame and connected by crank-arms P² and links P³ with the seed-box E. A rack-plate, P⁴, and lock-bar P⁵ upon the lever P serve to hold the lower frame in its adjusted position. When the lower frame is raised, the colters K', the conveyer of which operates the seed-shafts, are elevated above the ground out of the way, and at the same time cease to move the said seed-shafts and stop the operation of the seeding mechanism.

I claim as my invention and desire to secure by Letters Patent—

1. In a grain-drill, the upper frame supported upon the tongue and axle, the lower frame hinged to the forward end and adjusted upon the rear end of the upper frame, and a seed-box, combined with a series of colters, hoes, and seed-droppers supported upon the rear end of lower frame, substantially as described.

2. In a grain-drill, the combination of the wheel-frame, the cultivator-frame, and a double series of revolving colters alternating with a double series of hoes, and seed-droppers located each behind the colters of one series and between the colters of the other series, substantially as described.

3. In a grain-drill, the combination of the frame carrying a series of colters upon one shaft alternating between a series of co-operating colters upon a second shaft, and a series of hoes and seed-droppers located to follow the paths of said hoes and colters, substantially as described.

4. In a grain-drill, the combination, with the wheel-frame, of the cultivator-frame hinged at its forward end and adjusted at its rear end upon the wheel-frame, a seed-box having a feed device, and a series of colters geared to the said feed device supported upon the cultivator-frame, substantially as described.

5. The combination, with the seed-boxes, of a double series of seed-openings, force-feed conveyers arranged within the said seed-boxes, one in advance of the other, above their respective rows of seed-openings, which conduct the seed at the forward sides of the seed-box in one direction and seed at the rear sides of said seed-box in the opposite direction, substantially as described.

6. The combination, with the seed-box, of a double series of seed-openings arranged in parallel rows and alternately located, the screw feed-conveyers arranged one in advance of the other within the seed-box, above their respective rows of seed-openings, threaded in opposite directions, sprocket-wheels upon the ends of said shafts, and a chain driven by a shaft upon the frame and gearing with both of said sprocket-wheels, substantially as described.

WILLIAM NIGHSWONGER.

Witnesses:
FRANK NIGHSWONGER,
REUBEN C. ISRAEL.